United States Patent [19]

Campbell et al.

[11] Patent Number: 5,472,727
[45] Date of Patent: Dec. 5, 1995

[54] LOW-SAFA CREAM ALTERNATIVES

[75] Inventors: Iain J. Campbell, Wellingborough; Malcolm G. Jones, Stevington; Anne C. Peilow, Wollaston; Paul T. Quinlan, Kempston, all of Great Britain

[73] Assignee: Unilever Patent Holdings B.V., Vlaardingen, Netherlands

[21] Appl. No.: 190,930

[22] Filed: Feb. 3, 1994

[30] Foreign Application Priority Data

Feb. 3, 1993 [EP] European Pat. Off. ............ 93300806

[51] Int. Cl.$^6$ .......................................... A23J 3/00
[52] U.S. Cl. ..................... 426/570; 426/564; 426/601; 426/602
[58] Field of Search ...................... 426/564, 570, 426/602, 572, 586, 601

[56] References Cited

U.S. PATENT DOCUMENTS

| | | | |
|---|---|---|---|
| 3,785,831 | 1/1974 | Willock | 426/570 |
| 3,903,310 | 9/1975 | Buide et al. | 426/564 |
| 3,944,680 | 3/1976 | van Pelt et al. | 426/564 |
| 4,350,715 | 9/1982 | Rek | 426/570 |
| 4,647,465 | 3/1987 | van de Ven et al. | 426/570 |
| 4,770,892 | 9/1988 | Grealy et al. | 426/570 |
| 4,808,334 | 2/1989 | Ezaki et al. | 426/570 |
| 5,190,781 | 3/1993 | Van Heteren et al. | 426/521 |

FOREIGN PATENT DOCUMENTS

| | | |
|---|---|---|
| 0032808 | 7/1981 | European Pat. Off. . |
| 0483896 | 5/1992 | European Pat. Off. . |
| 509579 | 10/1992 | European Pat. Off. . |

OTHER PUBLICATIONS

Patent Abstracts of Japan, vol. 4174, C033, Dec. 1980 re JP55-114,261.
Derwent Publication re JP 55-224,261.

Primary Examiner—Donald E. Czaja
Assistant Examiner—Lien Tran
Attorney, Agent, or Firm—Cushman Darby & Cushman

[57] ABSTRACT

Whippable, water-continuous fat emulsions comprising 10–40% of a fat mixture with a composition obtained by blending at least fats A and B: 0.01–2 wt % of a thickener: 0.01–2 wt % of an emulsifier system and 1–8 wt % of a milk protein compound: fats A and B being: low in SAFA and free of trans (=fat A), a high in PUFA (=fat B), while the $N_5$ of the fat mixture ranges from 20 to 40 and the $N_{35}$ is less than 5 and the SAFA content of the fat mixture is less than 35 mol %.

10 Claims, No Drawings

LOW-SAFA CREAM ALTERNATIVES

DESCRIPTION OF THE PRIOR ART

Whippable, water-continuous fat emulsions having fat contents of 25–50 wt. % and wherein the fat applied has a PUFA content of at least 30 mol. %, and in particular selected from grapeseed oil, maize oil, safflower oil, soybean oil and sunflower oil, are known from U.S. Pat. No. 3,944,680.

In order to improve the rigidity of the cream after whipping, a small amount of a hardstock fat has to be present in the fat phase of the emulsion. An interesterified palmkernel melting point of 39° C. is mentioned as an example of this hardstock.

The above-mentioned products, however, require a pH of 4.2–5.5, while 0.5–4.0 wt. % of a globular protein needs to be present, whereas coagulated protein should be absent. Whippable, non-dairy creams based on fats, that are mainly liquid oils, which can contain up to 15 wt % of a completely saturated hard fat, are known form EP 509,579. In order to obtain acceptable whiptimes and product-performance 0.005–3 wt % of an inorganic salt is incorporated in the creams. According to EP 32,808 improved water-continuous fat-emulsions, that display better whipping performance are obtained, when the fatphase contains butterfat.

In above prior art no solution is given for the preparation of whippable cream alternatives, wherein fats are applied that have low SAFA-contents, whereas the products do not contain butterfat and/or an inorganic salt. Further we have found a solution for the fact, that the use of the known fat mixtures imparts to the whipped creams too warm an eating sensation and too prolonged a mouthfeel. Moreover, the firmness of these prior art whipped creams is not yet satisfactory.

SUMMARY OF THE INVENTION

Therefore, our invention is concerned with whippable water-continuous fat emulsions that overcome the drawbacks of the above-mentioned products and have an improved eating quality and mouthfeel while the Stevens values of the whipped products made from these compositions are also increased. Moreover, our compositions no longer require the presence of a globular protein and can therefore be free from globular protein. The pH requirement of 4.2–5.5 is no longer imperative either. The pH of our novel products can be about neutral as well (i.e. pH =6.5–7.5). Another important advantage is, that our novel creams are free of added inorganic salts.

Because of the application of a particular fat mixture, the SAFA level (=mol. % saturated fatty acids) of the fat phase of our novel compositions can remain under 35 mol. %, while simultaneously the fat phase of our products is free of trans-acids.

Therefore, our invention concerns a whippable, water-continuous fat emulsion comprising 10–40 wt. % of a fat mixture with a composition as obtainable by blending of at least fats A and B;

0.01–2 wt. % of a thickener;

0.01–2 wt. % of an emulsifier system;

1–8 wt. % of a milk protein compound wherein the fat mixture obtainable by blending of fats A and B consists of 10–35 wt. % of a fat A that is low in SAFA (=saturated fatty acids) and free from trans-acids, and 90–65 wt. % of fats B that are high in PUFA (=polyunsaturated fatty acids) and low in SAFA, the solid fat content of the fat mixture at 5° C. ($N_5$)=20–40 and at 35° C. (=$N_{35}$) is less than 5 (both NMR pulse, not stabilized) and the SAFA content of the total fat mixture being less than 35 mol. %.

DESCRIPTION OF PREFERRED EMBODIMENTS

Fat A of our fat phase displays in particular the following N-values (NMR pulse, not stabilized) : $N_{35}<15$ and $N_5$=60–100.

It is further preferred that fat A contains more than 50 wt. % of ($SU_2+S_2U$)-type triglycerides, S=saturated fatty acid $C_{16}$–$C_{22}$; U=mono- or polyunsaturated fatty acid having at least 18 C atoms. Very suitably, fats A are selected from the group consisting of palm mid-fractions, shea fractions, illipe, enzymically produced fats high in SUU and/or SUS triglycerides (S=saturated fatty acid $C_{16}$–$C_{22}$, U=unsaturated fatty acid having at least 18C atoms, e.g. $C_{18:1}$; $C_{18:2}$; $C_{18:3}$; $C_{18:4}$; $C_{20:4}$; C20:5 w3; $C_{22:6}$ w3) and mixtures thereof.

These fats are typically triglycerides high in at least one of the following triglycerides: $P_2U$, $St_2U$, $A_2U$, $B_2U$, $PU_2$; $StU_2$ or BU2, wherein P1 P=palmitic acid;

St=stearic acid;

A=arachidic acid;

B=behenic acid;

U=mono- or polyunsaturated fatty acid, e.g. $C_{18:1}$; $C_{18:2}$; $C_{18:3}$.

However, also triglycerides with two different saturated fatty acid residues, e.g. PStU, BPU, BStU etc. can be applied. Preferred fats, however, are fats high in POP, StOSt; POSt; StLnSt; StStLn wherein Ln=$C_{18:2}$Al.

Fat B is a liquid oil typically having a SAFA content of less than 15 mol. %. As the oil is liquid, its $N_{20}$ will be less than 5. Suitably, fats B are selected from the group consisting of soybean oil, sunflower oil, safflower oil, maize oil, rapeseed oil, grapeseed oil, olive oil, groundnut oil and cottonseed oil or fractions thereof or mixtures thereof.

The best products are obtained when a small amount of thickener is present. Preferred amounts applied are 0.05–1 wt. %. Although any thickener, e.g. selected from the group consisting of one or more of the carrageenans, locust bean gum, guar gum, starches, modified starches, pectins, gelatins, xanthan gum, alginate, agar, gum acacia, gum tragacanth, gellan gum, cellulose ethers or mixtures thereof can be applied, we have a preference for the application of guar gum.

In order to achieve stability, our emulsions should contain an emulsifier, preferably in amounts of 0.05–1 wt. %. Typical emulsifiers are lactodan, lecithin, polyglycerol esters, DATA esters, polyoxyethylene sorbitan esters and monoglycerides (both from saturated and unsaturated fatty acids). However, we prefer to apply a combination of a stabilizing emulsifier, such as a monoglyceride from a saturated fatty acid and a destabilizing emulsifier, such as lecithin. Examples of such an emulsifier system can be found in our earlier European patent application 455,288.

In order to impart an improved taste to our products we preferably add 2–6 wt. % of buttermilk powder as milk protein component to our compositions.

Typical product characteristics of our novel emulsions are:

whipping times, applying a Kenwood whipping machine KM-201, of less than 5 minutes, in particular less than 3 minutes;

viscosities at 5° C. and under a shear of 100 s$^{-1}$ of 30–150 mPa.s.

Physical characteristics of whipped products obtainable by whipping of our emulsions are:

overrun 140–230%

Stevens values of more than 20, in particular 25–50.

It should be pointed out that other whippable, water-continuous fat emulsions are known from U.S. Pat. No. 3,716,378. However, according to this patent the product must contain substantial amounts of butterfat, while a membrane substance, obtained by clarifixating of a milk with 2–7% of fat, must be present in the product. Further, the emulsion is churned. In our compositions only small amounts of butterfat (owing to the presence of BMP) are present. The membrane substance is completely absent in our compositions; moreover, our emulsions are not churned.

U.S. Pat. No. 3,903,310 mentions high-PUFA whippable cream alternatives. Typically, the ratio P: S is greater than 0.3. In order to achieve a stable whip, a protein hydrolysate needs to be present. We have found compositions wherein no protein hydrolysate is present and that still display good product performances, such as organoleptic properties, SAFA content, whipping time and firmness.

DE 3,002,037 discloses whippable cream alternatives wherein the fat consists of a partially hardened fat having a slip melting point of 20°–50° C., e.g. a sunflower oil slip melting point of 30° C. The slip melting point requirement, however, indicates that quite considerable amounts of trans-acids will be present in the fat phase. Our fat phase contains hardly any trans-fat.

In our earlier European patent application 469,656 we have disclosed non-dairy creams wherein considerable amounts of liquid oils can be present. However, in addition to the liquid oil, a hard fat (at least 15 wt. %) has to be present as well. As the hard fat is a fully hardened fat (e.g. hardened palmkernel fat), the SAFA content of the fat phase will be more than 35 mol. %. Moreover, the hard fat will not be free from trans-acids. Therefore, the products will be less healthy than the present products. A further advantage of the novel products according to our invention is that they need not be tempered.

EXAMPLES

An emulsion was made with the compositions according to the Table by making a premix of water, BMP, emulsifiers, fat phase and thickener.

The emulsion was heated to 80° C. and treated with steam (150° C.) for 3 seconds.

The emulsion obtained was homogenized in 1 stage at a pressure of 100 bar.

A sterilized, homogenized product was obtained, having a temperature of 80° C.

The product was cooled to 6° C. and packed.

TABLE 1

| | Hardstock applied | | | | | | |
|---|---|---|---|---|---|---|---|
| Ingredients | 1 | 2 | 3 | 4 | 5 | 6 | 7 |
| BMP | 6.0 | 6.0 | 6.0 | 6.0 | 6.0 | 6.0 | 6.0 |
| Guar gum | 0.1 | 0.1 | 0.1 | 0.1 | 0.1 | 0.1 | 0.1 |
| Hardstock | 6.0 | 7.5 | 10.4 | 10.4 | 10.4 | 10.4 | 9% of |

TABLE 1-continued

| | Hardstock applied | | | | | | |
|---|---|---|---|---|---|---|---|
| Ingredients | 1 | 2 | 3 | 4 | 5 | 6 | 7 |
| | | | | | | | (5) |
| Sunflower oil | 24.0 | 27.5 | 19.6 | 19.6 | 19.6 | 19.6 | 26.0 |
| Lecithin | 0.1 | 0.15 | 0.1 | 0.1 | 0.1 | 0.1 | 0.1 |
| Monoglyceride | 0.2 | 0.2 | 0.2 | 0.2 | 0.2 | 0.2 | 0.2 |
| Water | 63.6 | 58.6 | 63.6 | 63.6 | 63.6 | 63.6 | 58.6 |
| PUFA content | 50 | 51 | 42 | 42 | 42 | 42 | 48 |
| SAFA content | 30 | 30 | 30 | 30 | 30 | 30 | 24 |

Hardstocks applied
1* Interesterified palmkernel −38/hard palm oil −58 (50/50)
2* Palmkernel −38
3. Shea stearin
4. Shea stearin / Palm oil mid-fraction (70:30)
5. Blend of palm mid/shea sterain/Illipe: 45:35:20
6. Blend of palm mid/shea stearin: 20:80
7. Hardstock 5
* Not according to invention (SAFA content and/or trans-content of hardstock are (is) too high).

Results

Whipping times, overrun and firmness (Stevens values) were measured on the products by whipping with a Kenwood model KM-201, provided with a 500 Watt motor. The creams were whipped at 200 rpm under planetory mixing motion with a wire whisk.

The moment when maximum resistance to whipping occurred, stirring was stopped.

The results obtained are listed in Table 2.

TABLE 2

| | Hardstock | | | | | | |
|---|---|---|---|---|---|---|---|
| Properties | 1 | 2 | 3 | 4 | 5 | 6 | 7 |
| Whipping times (min.) | 3.45 | ** | 2.30 | 2.00 | 2.00 | 2.25 | 3.50 |
| Overrun (%) | 200 | | 175 | 150 | 150 | 155 | 155 |
| Firmness (Stevens) | 14 | | 33 | 40 | 30 | 46 | 20 |
| Viscosity at 5° C. 100 s$^{-1}$ (mPa · S) | 47 | 82 | 40 | 34 | 65 | 37 | 57 |

**did not whip.

We claim:

1. Whippable, water-continuous fat emulsion comprising 10–40 wt. % of a fat mixture obtained by blending of at least fats A and B;

0.01–2 wt. % of a thickener;

0.01–2 wt. % of an emulsifier system;

1–8 wt. % of a milk protein compound wherein the fat mixture obtained by blending of fats A and B comprises:

10–35 wt. % of a fat A that is low in SAFA and free from trans-acids, and

90–65 wt. % of fats B that are high in PUFA and low in SAFA, a solid fat content of the fat mixture at 5° C. ($N_5$)=20–40 and at 35° C. (=$N_{35}$) being less than 5 and the SAFA content of the fat mixture being less than 35 mol. % wherein the emulsion displays a whipping time, applying a Kenwood whipping machine, of less than 5 minutes, while its viscosity at 5° C. and 100 s$^{-1}$ ranges from 30–150 mPa.s, whereas the whipped structure, obtained after whipping, is characterized by an overrun of 140–230 and a Stevens value of 20–50.

2. Whippable, water-continuous fat emulsion according to claim 1, wherein fat A displays the following N-values (NMR pulse, not stabilized):

$N_{35} < 15$ $N_5 = 60–100$.

3. Whippable, water-continuous fat emulsion according to claim 1 or 2, wherein fat A contains more than 50 wt. % of ($SU_2 + S_2U$) triglycerides, S=saturated fatty acid $C_{16}–C_{22}$; U=mono- or polyunsaturated fatty acid having at least 18 C atoms.

4. Whippable, water-continuous fat emulsion according to claims 1 or 2, wherein fat A is a fat selected from the group consisting of palm mid-fractions, shea fractions, illipe, enzymically produced fats high in SUU or SUS triglycerides a mixture thereof (S=saturated fatty acid $C_{16}–C_{22}$, U=unsaturated fatty acid having at least 18 C atoms).

5. Whippable, water-continuous fat emulsion according to claims 1 or 2 wherein fat A is a fat high in at least one of the following triglycerides: $P_2U$, $St_2U$, $A_2U$, $B_2U$, $PU_2$; $StU_2$ or $BU_2$, wherein P=palmitic acid;

St=stearic acid;

A=arachidic acid;

B=behenic acid;

U=mono- or polyunsaturated fatty acid.

6. Whippable, water-continuous fat emulsion according to claim 1, wherein fat B is a liquid oil having a SAFA content of less than 15 mol. %.

7. Whippable, water-continuous fat emulsion according to claim 6, wherein fat B is selected from the group consisting of soybean oil, sunflower oil, safflower oil, maize oil, rapeseed oil, grapeseed oil, olive oil, groundnut oil and cottonseed oil or fractions thereof or mixtures thereof.

8. Whippable, water-continuous fat emulsion according to claim 1, wherein the thickener is selected from the group consisting of one or more of the carrageenans, locust bean gum, guar gum, starches, modified starches, pectins, gelatins, xanthan gum, alginate, agar, gum acacia, gum tragacanth, gellan gum, cellulose ethers or mixtures thereof.

9. Whippable, water-continuous fat emulsion according to claim 1, wherein the emulsifier system comprises at least one emulsifier chosen from the group consisting of lactodan, lecithin, polyglycerol esters, DATA esters, polyoxyethylene sorbitan esters and monoglycerides, both from saturated and unsaturated fatty acids.

10. Whippable, water-continuous fat emulsion according to claim 1, wherein the milk protein compound is buttermilk powder.

* * * * *